United States Patent [19]

Druy et al.

[11] Patent Number: 4,644,037

[45] Date of Patent: Feb. 17, 1987

[54] MULTICOMPONENT SYSTEMS BASED ON POLYPYRROLE

[75] Inventors: Mark A. Druy; Sukant K. Tripathy, both of Arlington, Mass.

[73] Assignee: GTE Laboratories Incorporated, Waltham, Mass.

[21] Appl. No.: 635,986

[22] Filed: Jul. 30, 1984

[51] Int. Cl.$^4$ .................. C08L 71/00; C08L 71/02; C08L 71/04; C25D 1/00
[52] U.S. Cl. .................. 525/390; 525/403; 525/410; 525/417; 204/59 R
[58] Field of Search ............ 525/390, 403, 410, 417; 204/13, 59 R

[56] References Cited

U.S. PATENT DOCUMENTS 4,468,291 8/1984 Naarmann et al. .............. 204/13
4,582,587 4/1986 Hotta et al. .............. 204/59 R

FOREIGN PATENT DOCUMENTS 0035713 9/1981 European Pat. Off. ......... 525/535
2124639 2/1984 United Kingdom .............. 525/417
2124635 2/1984 United Kingdom .

OTHER PUBLICATIONS

Kanzawa et al., J. Chem. Soc., Chem. Common., 1979, p. 854.
Druy et al., ACS Symposium Series, No. 242 "Polymers and Electronics", p. 472 (1984).
DePaoli et al., J. Chem. Soc., Chem. Common., 1984, p. 1015.
Niva et al., J. Chem. Soc., Chem. Common., 1984, p. 817.
Furukawa, American Metal Market/Metal Working News, May 22, 1984, p. 8.
Kanzawa et al., Synthetic Metals, 4 (1981), 119–130.
Diaz et al., "Mechanical Properties of Electrochemically Prepared Polypyrrole Films", IBM J. Res. Develop. 27, 342–347 (Jun. 1983).

Primary Examiner—Allan M. Lieberman
Attorney, Agent, or Firm—Martha Ann Finnegan; David M. Keay

[57] ABSTRACT

Compositions based on polypyrrole are described having incorporated therein a polyether, such as polytetrahydrofuran. The polyether is present in an amount of at least about 10 weight percent of the polypyrrole present. The compositions exhibit improved processing properties over these of polypyrrole. A process for producing the compositions is also described in which a pyrrole compound is electrochemically polymerized in the presence of a dissolved polyether.

10 Claims, 2 Drawing Figures

MULTICOMPONENT SYSTEMS BASED ON POLYPYRROLE

FIELD OF THE INVENTION

This invention is in the field of polymer chemistry. More specifically, this invention relates to polypyrrole, an aromatic polyheterocycle.

BACKGROUND OF THE INVENTION

Conducting polymers have been the subject of intense research activity for the past decade. Currently, much work is devoted to the synthesis of conducting polymers for use in a variety of applications. Polyacetylene, the prototype conducting polymer, has been successfully demonstrated to be useful in constructing p-n hetero-junctions, Schottky barrier diodes, liquid junction photoelectrochemical solar cells, and, more recently, as the active electrode in polymeric batteries.

The improved electrochemical synthesis of polypyrrole has led to its use as coating for the protection of n-type semiconductors against photocorrosion in photoelectrochemical cells. Research studies have shown that pyrrole and thiophene, five-membered heterocyclic aromatic ring compounds, undergo simultaneous oxidation and polymerization. Conducting polyheterocycles, such as polypyrrole and polythiophene, have demonstrated dramatic improvement in oxidative stability over other conducting polymers. However, polyheterocycles, like other known conducting polymers, are hampered by inferior mechanical properties.

Polypyrrole and polythiophene can be synthesized by electrochemical techniques on the surface of an electrode. Electrochemically synthesized polythiophene films are extremely brittle, making it difficult to remove the films from electrode surfaces without fragmentation. Electrochemically synthesized films of polypyrrole are less brittle than polythiophene films. Heretofore, electrochemically synthesized polypyrrole has exhibited poor processibility, i.e., has been difficult to process.

SUMMARY OF THE INVENTION

The present invention is directed to improving the processibility of electrochemically synthesized polypyrrole.

According to one aspect of the present invention a composition is provided which is a multicomponent system comprising a solid polypyrrole having incorporated therein a polyether, the polyether being present in an amount of at least about 10 weight percent of the polypyrrole present in the multicomponent system.

In another aspect of the present invention there is provided a method for preparing multicomponent systems comprising a polypyrrole and a polyether. The method involves electrochemically polymerizing a pyrrole compound in the presence of a dissolved polyether. More specifically, the method involves passing a current across an electrochemical cell containing a solution of an electrolyte, a polyether, and a pyrrole compound in a solvent in order to form a multicomponent system film on the anode of the cell.

Figure 1:
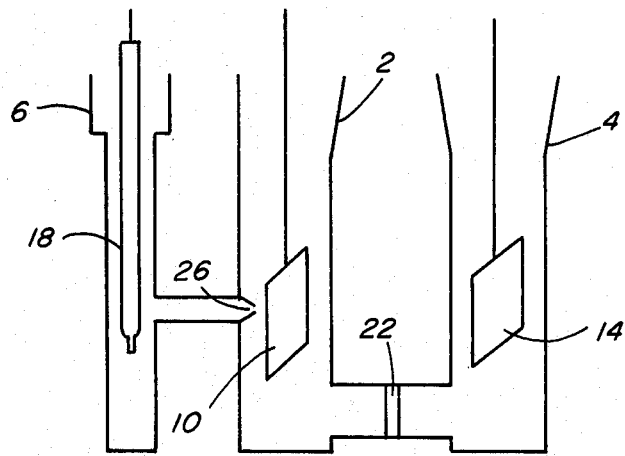
FIG. 1 is a schematic representation of an electrochemical cell suitable for use in the method of the present invention.

For a better understanding of the present invention, together with other and further objects, advantages and capabilities thereof, reference is made to the following disclosure and appended claims in connection with the above described drawings.

DETAILED DESCRIPTION OF THE INVENTION

The multicomponent system of the present invention is a composition which comprises a solid polypyrrole and a polyether. The polyether is present in an amount of at least about 10 weight percent of the polypyrrole present. Preferably, the polyether is present in an amount from about 10 to about 30 weight percent of the polypyrrole present. The multicomponent system of the present invention has improved processibility and mechanical integrity over polypyrrole. An additional advantage associated with the multicomponent system of the present invention over polypyrrole is that the d.c. electrical conductivity of the multicomponent system is increased by annealing the multicomponent material in air. A further advantage associated with the multicomponent system of the present invention is its processibility, i.e., the system can be molded or otherwise processed using a combination of heat and pressure.

The properties of a multicomponent system having a polyether content less than about 10 weight percent of the polypyrrole present exhibit little or no improvement over those of polypyrrole. The incorporation of a polyether content above thirty weight percent of the polypyrrole present produces a material which has improved processibility and mechanical integrity over polypyrrole, but which is more insulating than polypyrrole.

The method of the present invention produces a multicomponent system comprising a polypyrrole and a polyether. This method includes passing a current across an electrochemical cell which contains a solution of an electrolyte, a polyether, and a pyrrole compound in a solvent. The application of the current across the solution results in the formation of a film, or layer, of the polypyrrole/polyether multicomponent system on the anode. The polypyrrole/polyether film produced in accordance with the method of the present invention is a "pliant", i.e., the film can be removed from the electrode surface on which it is grown and can be handled and processed without breaking or fragmenting.

For a pyrrole compound to be suitable for use in the present method, it must be capable of being electrochemically polymerized. Examples of polymerizable pyrrole compounds include:

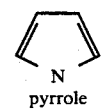

pyrrole

-continued

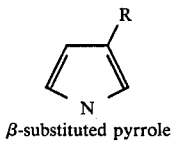

β-substituted pyrrole wherein R is CH$_3$, Cl, or Br

The concentration of the pyrrole compound in the solution of this method should be at least 0.01 mole/liter (M). Preferably the pyrrole compound concentration is from about 0.01 M to about 1.0 M.

The choice of solvent employed to form the solution of this invention is not critical. Any suitable solvent may be used. A suitable solvent is a solvent in which the pyrrole compound is soluble and in which the polymerized pyrrole compound is insoluble. Additionally, the solvent must be electrochemically inert at the potential at which the pyrrole compound is oxidized. Examples of typical solvents include benzonitrile, tetrahydrofuran, acetonitrile, nitrobenzene, and nitromethane.

Selection of an electrolyte and a polyether suitable for use in the present method is dependent upon the particular solvent selected. Any electrolyte which is soluble in the solvent being used and which is electrochemically inert at the potential at which the pyrrole compound is oxidized is a suitable electrolyte for use in the present method. For example, lithium perchlorate (LiClO$_4$) and tetrabutyl ammonium tetrafluoroborate ((C$_4$H$_9$)$_4$ NBF$_4$) are suitable electrolytes for use with a tetrahydrofuran or acetonitrile solvent.

A polyether is suitable for use in the method of the present invention provided the polyether is soluble in the solvent of the method. For example, polytetrahydrofuran is a suitable polyether for use with a tetrahydrofuran solvent. Polyoxyethylene, polyoxypropylene, and poly(oxy-1,3-phenylene) are other examples of polyethers which are soluble in acetonitrile and/or tetrahydrofuran. Accordingly, these polyethers are typical polyethers for use in the present method. Preferably the polyether is polytetra-hydrofuran.

The films prepared by the process of this invention can be grown to various thicknesses on the working electrode of the cell with different current rates. The film thickness can be also controlled by varying the period of time during which a current is applied across the cell. As the thickness of the film increases, the surface of the film becomes nodulose.

The polymerization current density should be at least 0.1 mA/cm$^2$. Preferably, the polymerization current density used with respect to the anode is from 0.1 mA/cm$^2$ to about 1 mA/cm$^2$. Most preferably the current density is about 0.8 mA/cm$^2$.

The process for preparing a polypyrrole/polyether multicomponent system may be carried out in an electrochemical cell such as the electrochemical cell of FIG. 1. A working electrode 10, the anode, is placed in a first compartment 2. A counter electrode 14, the cathode, is placed in a second compartment 4. A reference electrode 18 is placed in a third compartment 6. A current is applied to the working electrode, and passes through the solution contained in the cell for a period of time sufficient to form a film of predetermined thickness on the surface of the working electrode, which is the anode of the cell. The working electrode is separated from the counter electrode by a medium porosity frit 22. The reference electrode makes contact with the solution via a lugin capillary 26.

Both potentiostatic and galvanostatic conditions can be used to synthesize the multicomponent system. The polypyrrole/polyether can be grown on a platinum or gold working electrode as, well as on an SnO$_2$ coated glass working electrode.

The films which are synthesized by the process of this invention are flexible, air stable, and have conductivities from $10^{-2}$ to 1 (ohm-cm)$^{-1}$.

Neutral films can be produced by reversing the direction of current flow until the potential of the working electrode indicates the polymeric film is no longer being reduced to the neutral state.

In a preferred embodiment of the method of this invention, the solution of the process comprises a pyrrole compound, polytetrahydrofuran, and an electrolyte in a solvent of tetrahydrofuran.

Most preferably, polytetrahydrofuran is electrochemically synthesized in situ, before the pyrrole compound is added to the cell, by applying a current across the electrochemical cell which contains a solution consisting essentially of tetrahydrofuran and an electrolyte.

The following example will more completely illustrate the practice of this invention. It will, be readily understood by those skilled in the art that the example should not be construed as limiting the scope of this invention in any way.

While the following is directed to a multicomponent system based on polythiophene, a multicomponent system based on polypyrrole will behave in an analagous manner.

The cell of FIG. 1 was used for the electrochemical synthesis of a multi-component system incorporating polythiophene and polytetrahydrofuran. 50 ml of a 1M solution of LiClO$_4$ in tetrahydrofuran (THF) was added to the cell. A platinum (Pt) working electrode 10 was placed in the first compartment 2 and a nickel (Ni) counter electrode 14 was placed in the second compartment 4. A reference electrode 18 was placed in the third compartment 6. A constant current of 0.8 mA/cm$^2$ was applied to the working electrode and current was passed for a duration of 4.8 coulombs/cm$^2$. During this time, polymerization of tetrahydrofuran occurred. The formation of polytetrahydrofuran causes the solution to become viscous as some of the polytetrahydrofuran precipitates out of solution. After the passage of 4.8 coulombs/cm$^2$ across the cell to form polytetrahydrofuran, 0.1 gram of 2,2'-bithiophene was added to the first compartment 2 which contained approximately 25 ml of the solution containing LiClO$_4$ and polytetrahydrofuran. An additional 4.8-8 coulombs/cm$^2$ was passed through the solution containing the 2,2'-bithiophene at a current density of 0.8 mA/cm$^2$. While the current was applied across the cell, a film grew on the working electrode surface. The thickness of the film was controlled by the coulombs/cm$^2$ which was passed. The film was removed from the electrode surface and washed in tetrahydrofuran to remove unreacted 2,2'-bithiophene, LiClO$_4$, and polytetrahydrofuran from the surface of the film. The film was pliant, which permitted the film to be removed from the electrode without the film fragmenting. The film produced had a thickness of ~100 microns.

The polythiophene/polytetrahydrofuran film was analyzed via scanning electron microscopy (SEM). The film was subsequently extracted with tetrahydrofuran. After extraction, the film was again analyzed under the scanning electron microscope. Infrared spectroscopy of the material isolated during the extraction revealed that the film contained polytetrahydrofuran. The SEM photomicrographs showed that the polytetrahydrofuran present in film interconnects nodules of polythiophene. The film contained approximately 20% polytetrahydrofuran, as confirmed by weight loss after extraction.

The polytetrahydrofuran content of the film can be manipulated to an extent by varying the conditions. For example, the polytetrahydrofuran content of a polythiophene/polytetrahydrofuran multicomponent system can be increased by polymerizing THF for a longer period of time and polymerizing thiophene for a shorter period.

The tensile strength of the polythiophene/polytetrahydrofuran multicomponent system of the example was 1000 psi (70.30 kg/cm$^2$. The elongation of the multicomponent system film at the break ($l_f/l_o$) was 1.03. A comparison of the tensile strength of the polythiophene/polytetrahydrofuran film, prepared in accordance with this invention, with the tensile strength of a film consisting only of polythiophene could not be made because a sample of electrochemically synthesized polythiophene film of suitable size for measuring tensile strength could not be removed from the electrode without fragmenting. The mechanical integrity of polythiophene is shown to be improved via the method of the present invention by the fact that the multicomponent film can be manipulated without breaking or fragmenting.

Figure 2:
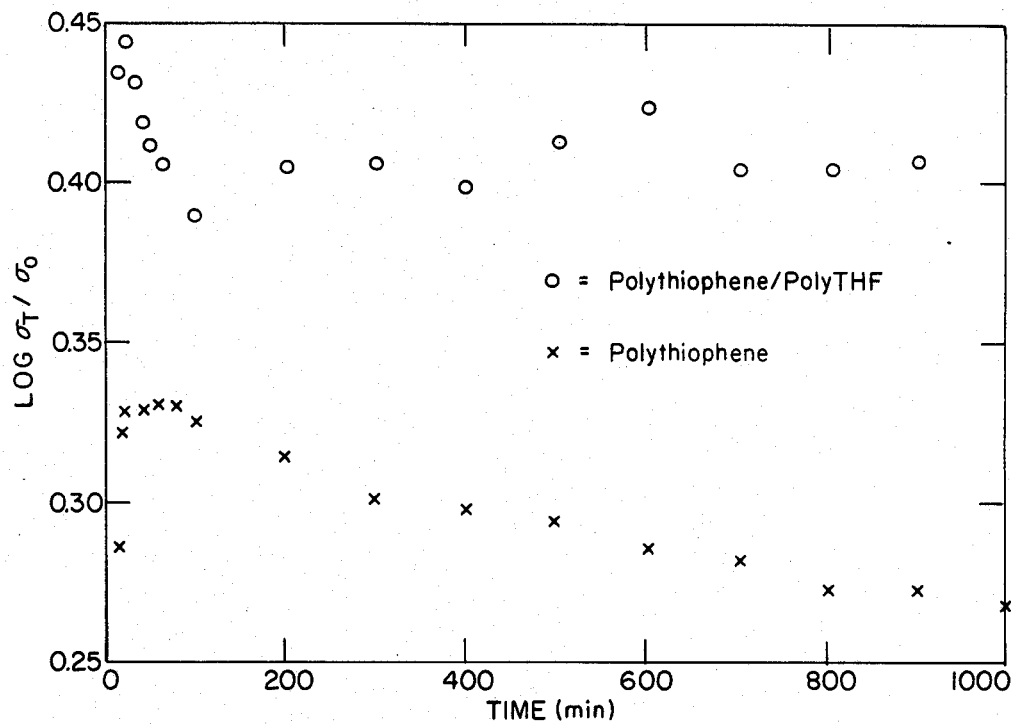
FIG. 2 is a graphical comparison of the conductivity of a multicomponent system comprising polythiophene and polytetrahydrofuran to that of polythiophene, as measured at 110° C. in laboratory air.

The d.c. electrical conductivity of the polythiophene/polytetrahydrofuran film produced by the present method is from $10^{-2}$ to 1.0 (ohm-cm)$^{-1}$, depending upon polymerization conditions. The conductivity is increased by annealing the film in air. FIG. 2 presents accelerated stability life data for polythiophene and for a polythiophene/polytetrahydrofuran (polyTHF) multi-component system. More specifically, FIG. 2 compares the conductivity of a polythiophene sample at 110° Celsius as a function of time to the conductivity of a polythiophene/polyTHF multicomponent system sample at 110° C. as a function of time. In FIG. 2, conductivity is represented as log $\sigma_T/\sigma_0$, where $\sigma_T$ is the conductivity at time=T and $\sigma_0$ is the conductivity at time=0. For both polythiophene and the polythiophene/polyTHF multicomponent system $\sigma_0$ was measured to be 0.02 (ohm-cm)$^{-1}$. FIG. 2 shows that the conductivity of the polythiophene/polyTHF multicomponent system remained constant after a short initial thermal activation process while the conductivity of the polythiophene decreased after a short initial thermal activation process. After cooling to room temperature, the conductivity of the multicomponent system was about 10% higher than the conductivity prior to the high temperature life test. After cooling to room temperature, the conductivity of polythiophene was about 20% less than prior to heating.

The incorporation of polytetrahydrofuran into films of polythiophene, as described above, enables the multicomponent system to be processed after synthesis, i.e., the multicomponent system in accordance with the present invention can be molded into desirable shapes using low temperatures and pressures. For example, washers of the multicomponent were fabricated using a teflon mold. The washers were fabricated by cutting the polythiophene/polytetrahydrofuran multicomponent material into pieces, loading it into the mold and heating the mold to 76 degrees celsius under a constant pressure of about 20 psi (1.4 kg/cm$^2$).

Wide band absorption testing conducted on the polythiophene/polytetrahydrofuran multicomponent system of this invention has shown the composition to be a radar absorbing material (RAM). Measurements of the electric permitivity of the polythiophene/polytetrahydrofuran multicomponent system as a function of frequency in the 2–18 GHz range showed the multicomponent system to be absorbing in the 2–18 GHz range. Absorption beyond this range was not measured, but is clearly anticipated.

The material of the present invention exhibits thermal and oxidative stability is processible, and exhibits a higher degree of mechanical integrity than polypyrrole.

What is claimed is:

1. A composition comprising a solid polypyrrole having incorporated therein polyether, the polyether being present in an amount of at least about 10 weight percent of the polypyrrole present.

2. A composition in accordance with claim 1 wherein the polyether is present in an amount from 10 weight percent to about 30 weight percent of the polypyrrole present.

3. A composition in accordance with claim 1 wherein the polypyrrole is prepared by electrochemical polymerization of a pyrrole compound selected from the group consisting of:

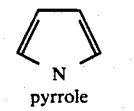

pyrrole

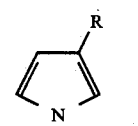

β-substituted pyrrole wherein R is CH$_3$, Cl, or Br

4. A composition in accordance with claim 3 wherein the pyrrole compound is pyrrole.

5. A composition in accordance with claim 3 wherein the polyether is selected from the group consisting of polytetrahydrofuran, polyoxyethylene, polyoxypropylene, and poly(oxy-1,3-phenylene).

6. A composition in accordance with claim 5 wherein the polyether is polytetrahydrofuran.

7. A method for preparing a multicomponent system comprising a polypyrrole and a polyether, said method comprising:

passing a current across an electrochemical cell containing a solution comprising a pyrrole compound, an electrolyte, and a polyether in a solvent to form a multicomponent system film of predetermined thickness on the anode of the cell, wherein:

said pyrrole compound is electrochemically polymerizable;

said solvent is selected such that said pyrrole compound is soluble therein and the polypyrrole is insoluble therein, said electrolyte is soluble in said solvent; and said polyether is soluble in said solvent.

8. A method in accordance with claim 7 wherein the density of the current flow to the anode is at least 0.1 mA/cm².

9. A method in accordance with claim 7 wherein the pyrrole compound is pyrrole and the polyether is polytetrahydrofuran.

10. A method for preparing a multicomponent system comprising a polypyrrole and a polyether, said method comprising:

passing a current across an electrochemical cell containing a solution of an electrolyte in tetrahydrofuran to form a polytetrahydrofuran precipitate in the solution;

adding an electrochemically polymerizable pyrrole compound to the solution contained in said electrochemical cell; and passing a current across said electrochemical cell containing the solution comprising said pyrrole compound, said polytetrahydrofuran precipitate, and said electrolyte in tetrahydrofuran to form a multicomponent system film of predetermined thickness on the anode of the cell.

* * * * *